(12) United States Patent
Tucker

(10) Patent No.: US 8,724,677 B1
(45) Date of Patent: *May 13, 2014

(54) ARCHITECTURE FOR ULTRA-WIDEBAND RADIO

(71) Applicant: James L. Tucker, Clearwater, FL (US)

(72) Inventor: James L. Tucker, Clearwater, FL (US)

(73) Assignee: University of South Florida, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/056,445

(22) Filed: Oct. 17, 2013

Related U.S. Application Data

(60) Continuation of application No. 13/693,652, filed on Dec. 4, 2012, now Pat. No. 8,588,270, which is a division of application No. 11/958,960, filed on Dec. 18, 2007, now Pat. No. 8,351,483.

(60) Provisional application No. 60/870,510, filed on Dec. 18, 2006.

(51) Int. Cl.
*H04B 1/00* (2006.01)

(52) U.S. Cl.
USPC ........... 375/147; 375/130; 375/136; 375/138; 375/142; 375/134; 375/137; 375/143; 375/144; 375/145; 375/149; 375/150; 375/152; 375/324; 375/325; 375/340; 375/346; 342/83; 342/94; 342/100; 342/135; 342/137; 342/136; 342/145; 342/202; 327/31; 327/38; 327/48; 327/135; 327/131; 327/151; 327/152; 327/161; 327/160; 327/265

(58) Field of Classification Search
USPC ......... 375/130, 136, 138, 142, 134, 137, 143, 375/144, 145, 147, 149, 150, 152, 324, 325, 375/340, 343, 346; 342/83, 94, 100, 135, 342/137, 136, 145, 202; 327/31, 38, 48, 327/135, 131, 151, 152, 161, 160, 265
See application file for complete search history.

(56) References Cited

U.S. PATENT DOCUMENTS 5,677,927 A * 10/1997 Fullerton et al. .............. 375/130
5,687,169 A    11/1997 Fullerton (Continued)

FOREIGN PATENT DOCUMENTS

EP     0823152 B1   7/2004
WO    9609694 A1   3/1996

(Continued)

OTHER PUBLICATIONS

Jeong Soo Lee and Cam Nguyen. "Novel Low-Cost Ultra-Wideband, Ultra-Short-Pulse Transmitter with MESFET Impulse-Shaping Circuitry for Reduced Distortion and Improved Pulse Repetition Rate." IEEE Microwave and Wireless Components Letters. 2001. Volume 11 (No. 5): 208-210.

(Continued)

*Primary Examiner* — Daniel Washburn
*Assistant Examiner* — Rahel Guarino
(74) *Attorney, Agent, or Firm* — Nilay J. Choksi; Smith & Hopen, P.A.

(57) ABSTRACT

Provided are a method and apparatus (receiver) of receiving and processing a radio signal in a transmitter-receiver environment. The radio signals are transmitted across a wireless interface using Ultra Wideband (UWB) pulses. A transmitted reference approach is utilized. The radio signal include pairs of UWB pulses with each pair of pulses separated by a fixed time delay. The two pulses are then combined to provide for improved noise immunity.

20 Claims, 8 Drawing Sheets

(56) References Cited

U.S. PATENT DOCUMENTS

| | | | |
|---|---|---|---|
| 5,757,320 | A | 5/1998 | McEwan |
| 5,805,110 | A | 9/1998 | McEwan |
| 5,960,031 | A | 9/1999 | Fullerton et al. |
| 5,995,534 | A | 11/1999 | Fullerton et al. |
| 6,031,862 | A | 2/2000 | Fullerton et al. |
| 6,142,059 | A | 11/2000 | Chan et al. |
| 6,239,741 | B1 | 5/2001 | Fontana et al. |
| 6,295,019 | B1 | 9/2001 | Richards et al. |
| 6,430,208 | B1 | 8/2002 | Fullerton et al. |
| 6,535,161 | B1 | 3/2003 | McEwan |
| 6,763,057 | B1 | 7/2004 | Fullerton et al. |
| 8,588,270 | B1 * | 11/2013 | Tucker .......................... 375/130 |
| 2002/0061080 | A1 * | 5/2002 | Richards et al. .............. 375/346 |
| 2003/0043931 | A1 | 3/2003 | Fullerton et al. |
| 2003/0076136 | A1 | 4/2003 | McCorkle et al. |
| 2003/0108133 | A1 | 6/2003 | Richards |
| 2004/0157550 | A1 | 8/2004 | Nakagawa |

FOREIGN PATENT DOCUMENTS

| | | | |
|---|---|---|---|
| WO | 9619737 | A1 | 6/1996 |
| WO | 0143386 | A1 | 6/2001 |
| WO | 0176086 | A3 | 10/2001 |
| WO | 0244748 | A3 | 6/2002 |

OTHER PUBLICATIONS

Fernando Ramirez-Mireles. "Performance of Ultrawideband SSMA Using Time Hopping and M-ary PPM." IEEE. Journal on Selected Areas in Communication. Jun. 2001. vol. 19. No. 6.: 1186-1196.

Moe Z. Win and Robert A. Scholtz. "Impulse Radio: How it Works." IEEE. Communication Letters. 1998. Volume 2 (No. 2): 36-38.

Andreas F. Molish, Yves-Paul Nakache, Philip Orlik, Jin Zhang, Yunnan Wu, Sinan Gezici, S.Y. Kung. "An Efficient Low-Cost Time Hopping Impulse Radio for High Data Rate Transmission." Mitsubishi Electric Research Laboratories. Cambridge, Massachusetts. Nov. 2003.

Jeongwoo Han and Cam Nguyen. "A New Ultra-Wideband, Ultra-Short Monocycle Pulse Generator with Reduced Ringing." IEEE. Microwave and Wireless Components Letters. vol. 12. No. 6. Jun. 2002.

Xiaomin Chen and Sayfe Kiaei. "Monocycle Shapes for Ultra Wideband Systems." IEEE International Symposium on Circuits and Systems. 2002. Volume 1: 597-600.

Kevin Marsden, Hyung-Jin Lee, Dong Sam Ha and Hyung-Soo Lee. "Low Power CMOS Reprogrammable Pulse Generator for UWB Systems." Int. Conf. on Ultra Wideband Systems and Technologies. Reston, VA. pp. 443-447. Nov. 2003.

Glenn D. Weeks, J. Keith Townsend and James A. Freebersyser. "Performance of Hard Decision Detection for Impulse Radio." Military Communications Conference Proceedings MILCOM IEEE. 1999. Volume 2: 1201-1206.

Won Namgoong. "A Channelized DSSS Ultra-Wideband Receiver." IEEE. 2001: 105-108.

Giuseppe Durisi and Sergio Benedetto. "Comparison Between Coherent and Non-coherent Receivers for UWB Communications." Eurasip Journal on Applied Signal Processing: pp. 1-9.

Antonio Petraglia and Sanjit K. Mitra. "High Speed A/D Conversion Using QMF Banks." IEEE. 1990: pp. 2797-2800.

D. Dickson and P. Jett. "An Application Specific Integrated Circuit Implementation of a Multiple Correlator for UWB Radio Applications." IEEE. 1999.

A. Azakkour, M. Regis, F. Pourchet and G. Alquie. "Challenges for a new integrated Ultra-wideband (UWB) source." Ultra Wideband Systems and Technologies, 2003 IEEE Conference on Nov. 16-19, 2003, pp. 433-437.

CDMA Design Staff, Spread Spectrum Series Part 1, Berkeley Varitronics System.

Spread Spectrum Series Part 2: Correlators. Berkeley Varitronics System.

B. Sheyer, Spread Spectrum Series Part 3: Delay Lock Loop in CDMA, Berkeley Varitronics System.

T. Buchegger and Gerald Obberger. "A Novel Low-Cost Ultra Wideband Microstrip Pulse Forming Network for Gaussian Monocycle Generation." Linz Center of Competence in Mechatronics. 26 pages.

J. Reed., R.M. Buehrer and D.S. HA. "Introduction to UWB: Impulse Radio for Radar and Wireless Communications." Virginia Polytechnic Institute & State University Mobile & Portable Radio Research Group (MPRG). 55 pages.

"PulsON Technology Overview." Time Domain Corporation. Copyright Jul. 2001. 12 pages.

D. Bateman. "RF Aspects of Ultra-Wideband, Tutorial session IWUWBS Oulu." Motorola Labs CRM/BSTL. Motorola, 56 pages.

G.B. Giannakis. "Ultra Wideband Communications: An Idea whose Time has Come." Center of Excellence Wireless and Information Technology (CEWIT). Nov. 13, 2003. 35 pages.

Federal Communications Commission, First Report and Order: Revision of Part 15 of the Commission's Rules Regarding Ultra-Wideband Transmission Systems, Adopted Feb. 14, 2002; Released Apr. 22, 2002. 118 pages.

* cited by examiner

ARCHITECTURE FOR ULTRA-WIDEBAND RADIO

CROSS REFERENCE TO RELATED APPLICATIONS

This application is a continuation of and claims priority to U.S. patent application Ser. No. 13/693,652, entitled "Architecture for Ultra-Wideband Radio", filed Dec. 4, 2012 by the same inventor, which is a divisional of and claims priority to U.S. application Ser. No. 11/958,960, entitled "Architecture for Ultra-Wideband Radio", filed Dec. 18, 2007 by the same inventor, which is a continuation of and claims priority to U.S. Provisional Application No. 60/870,510, entitled "Architecture for Ultra Wide Band Radio", filed Dec. 18, 2006 by the same inventor, all of which are incorporated herein by reference.

BACKGROUND OF THE INVENTION

Ultra-wideband (UWB) pulse technology has been at work for many years, but has traditionally been used in classified applications. However, with the increasing number of wireless applications, UWB is seen as a technology that can provide additional bandwidth utilization without contributing to spectral crowding.

UWB communication employs the technique of transmitting high frequency, narrow-duration impulses, referred to as monocycles, through the radio channel. This provides a very large signal bandwidth from which the name arises. UWB radio does not require base band modulation. This characteristic makes this mechanism very desirable because, unlike other radio technologies, it is carrier-less and, thus, provides the potential for reduced complexity and reduced cost. Although UWB promises to provide a viable, cost-effective, high-bandwidth, short-range radio communication channel solution there are considerable obstacles to overcome.

The example in FIG. 1 illustrates a multi-user transmission 10 where there are three users 20, 22, 24 each with a unique orthogonal time hopping code where each bit is represented by three pulses (i.e. 20a, 20b and 20c). A radio communicating with user 20 transmits three pulses, 20a, 20b and 20c, having a bit duration 12 and frame duration 14, for each bit sent in the time sequence designated to user 20. The receiver used by user 20 compares the received data against its designated time sequence until it finds a match then the receiver synchronizes to the received signal.

Once synchronized to the received channel, the receiver must then decode the modulated data. This design supports On-Off Keying (OOK) and Pulse Position Modulation (PPM). OOK is a type of modulation in which data pulses are switched on and off to modulate between 1 and 0 as shown in FIG. 2. PPM is a type of modulation in which the position of the monocycle is time-shifted to indicate a 1 or 0, as shown in FIG. 3.

As seen in the example above, impulse radio relies on a high precision timing sequence. The transmitter must broadcast pulses at precise time intervals constituting a specific time hopping sequence that repeats for each bit time. For a receiver to detect a broadcast, the receiver must generate its own local timing sequence that matches that of the transmitter. The receiver uses its local sequence to determine precisely the times that pulses are expected. The receiver then checks for pulses at each of these sequence times and then sums the total number of pulses detected over the length of the code sequence. This sum gives an indication of whether or not a bit is present.

SUMMARY OF INVENTION

The invention includes methods, and associated apparatuses, for generating, transmitting, detecting, and processing radio signals across a wireless interface using Ultra Wideband (UWB) pulses. A transmitted reference approach is utilized. The radio signal include pairs of UWB pulses with each pair of pulses separated by a fixed time delay. The two pulses are then combined to provide for improved noise immunity.

Transmitter topology, receiver topology, and methods for generating and transmitting a radio signal at a transmitter and detecting and processing a radio signal at a receiver are provided.

The transmitter of the present invention comprises a sequence generator and an output state. The sequence generator generates and outputs a timing sequence and the output stage generates an impulse radio signal using the timing sequence. The impulse radio signal generated by the output stage comprises a plurality of dual pulses spaced in time. In an embodiment of the transmitter, the sequence generator modulates the timing sequence using a data signal and outputs the modulated timing sequence. In another embodiment, the sequence generator performs a type of modulation chosen from the group comprising On-Off Keying and Pulse Position Modulation. In an embodiment, the transmitter further comprises a high-speed serializer, which is used to create a high-speed timing sequence by multiplexing the timing sequence. The output stage may generate the impulse radio signal using the high-speed timing sequence. The output stage may be selected from the group comprising PIN diodes, Schottky diodes, varactor diodes, step recovery diodes, avalanche transistors, and passive resonant circuits. In a further embodiment, the output stage comprises a buffer to generate a first and a second output, a delay line to delay the first output, and a multiplier to multiply the delayed first output and the second output. The delay line of the output stage may delay the first output by about one pulse width. The output stage further may further comprise an amplifier to amplify the generated radio signal. The amplifier may be a variable gain amplifier. In another embodiment, the output stage further comprises an antenna to transmit the radio signal into a propagation medium.

The method for generating and transmitting a radio signal in a transmitter-receiver environment comprises generating a timing sequence and generating an impulse radio signal using the timing sequence, wherein the radio signal comprises a plurality of dual pulses spaced in time. In an embodiment, the method further comprises modulating the timing sequence using a data signal. The type of modulation performed may be chosen from the group comprising On-Off Keying and Pulse Position Modulation. In another embodiment, the method further comprises creating a high-speed timing sequence by multiplexing the timing sequence. The plurality of dual pulses may be generated using the high-speed timing sequence. In a further embodiment, generating a plurality of dual pulses using the high-speed timing sequence comprises generating a differential pair of sequences from the high-speed timing sequence, comprising a first differential sequence and a second differential sequence, delaying the first differential sequence, and multiplying the delayed first differential sequence and the second differential sequence. The first differential sequence may be delayed by about one pulse width. In another embodiment, the method further comprises amplifying the generated radio signal. In a further embodiment, the method comprises transmitting the radio signal into a propagation medium.

In general, the receiver comprises an antenna, fixed analog delay line, multiplier, local serializer with a sequence matching the receiver, digital delay lines, a low noise amplifier and logic fan-out buffer along with an array of D flip-flop pairs. Each flip-flop pair is enabled, at fixed time increments, to only detect signals at a precise time; the timing is controlled by the pseudo-random sequence generated by the local serializer. This topology reduces the clock rate requirements of logic required to process the received signal. The receiver utilizes a local tunable oscillator that is controlled by detecting the phase change of the incoming signal and applying compensation to maintain the phase alignment and clock synchronization of the receiver to the clock reference of the transmitter.

The receiver comprises a receiving stage to receive a radio signal having at least two pulses separated by a fixed time; a signal modification stage to create a signal with an amplitude larger than the received signal using the received signal; a fan-out stage to replicate the larger-amplitude signal to generate at least two duplicate signals; a sequence generator stage to serially generate a timing sequence; at least one sequence delay stage to replicate the timing sequence into a plurality of timing sequences each delayed in time; and at least one counter control stage to output a counter value responsive to the pulse of one of the duplicate larger amplitude signals and one of the plurality of timing sequences.

In an embodiment, the receiver may further comprise an amplification stage to amplify the received radio signal. The amplifier stage may comprise at least one of a low-noise amplifier and a variable-gain amplifier.

In another embodiment, the signal modification stage comprises at least one signal delay stage to delay the received radio signal by the fixed time between the at least two pulses; and at least one combination stage to combine the delayed and received radio signals. The at least one combination stage may comprise a multiplier to multiply the delayed and received radio signals or a summer to sum the delayed radio signal.

In an additional embodiment, the receiver further comprises an amplification stage to amplify the larger amplitude signal. In a further embodiment, the fan-out stage comprises at least one buffer. The sequence generator stage may comprise a serializer. The plurality of timing sequences may be consecutive timing sequences delayed in time by less than half of the fixed time between the at least two pulses of the original timing sequence.

In another embodiment, the receiver further comprises at least one removal stage to remove at least one expected narrow-band interferer, having a known period. The removal stage may comprise at least one delay stage to delay the larger amplitude signal by the period of the expected interfering signal; and at least one multiplier to multiply the delayed larger amplitude signal and the expected interfering signal.

The counter value may be used to increment a counter. The counter value may be responsive to the rising edge of the pulse of the duplicate larger amplitude signal. The counter value may be reset after a predetermined delay time.

In a further embodiment, the counter control stage comprises a first D flip-flop with an input connected to the timing sequence and a clock connected to the pulse of the duplicate larger amplitude signal to output the value of the timing sequence according to the pulse of the duplicate larger amplitude signal; and a second D flip-flop with an input set to a predetermined value and a clock connected to the output of the first D flip-flop to output the predetermined value when the clock is enabled by the timing sequence. The value of the timing sequence may be output on the rising edge of the pulse of the duplicate larger amplitude signal.

The method of receiving and processing a radio signal in a transmitter-receiver environment comprises receiving a radio signal having at least two pulses separated by a fixed time; creating a larger-amplitude signal having an amplitude larger than the received signal; replicating the larger-amplitude signal to generate at least two duplicate signals; generating a timing sequence; replicating the timing sequence into a plurality of timing sequences each delayed in time; and outputting at least a first counter value responsive to the value of one of the plurality of timing sequences being valid when the value of one of the at least two duplicate signals transitions.

Creating a signal with an amplitude larger than the amplitude of the received signal may comprise delaying the received radio signal by the fixed time between the two pulses; and combining the delayed and received radio signals. Combining the delayed and received radio signals may comprise multiplying, summing, or superpositioning the delayed and received radio signals.

In an embodiment, the method further comprises amplifying the received radio signal. In another embodiment, the method further comprises amplifying the larger amplitude signal.

In an additional embodiment, the method further comprises removing an expected interfering signal, having a known period, from the larger amplitude signal. Removal may comprise delaying the larger amplitude signal by the period of the expected interfering signal; and multiplying the delayed larger amplitude signal and the expected interfering signal.

In another embodiment, the method further comprises summing the value of the first counter value over a first period of time; summing the value of at least a second counter value over the first period of time; tracking the number of pulses that occur over a second period of time using at least the first two sums; and adjusting the phase of the timing sequence using the number of pulses.

In a further embodiment, the plurality of timing sequences are consecutive timing sequences delayed in time by less than half of the fixed time between the at least two pulses of the original timing sequence.

In another embodiment, the method for receiving and processing a radio signal in a transmitter-receiver environment comprises receiving a radio signal having at least two pulses and a fixed time between the at least two pulses; generating a pseudo-random sequence with a time hopping code matching that of the transmitter; detecting the pulses at a plurality of times dictated by the pseudo-random sequence; summing the pulses at a plurality of time periods during the times dictated by the pseudo-random sequence during; and determining the phase shift of the incoming signal over a bit time. The method may further comprise synchronizing the clock of the receiver with the received radio signal using the phase shift of the incoming signal. In a further embodiment, the method further comprises demodulating the data in the received radio signal using the phase shift of the incoming signal.

The method of adjusting the frequency of a receiver's local clock reference in a transmitter-receiver environment such that its average frequency equals a transmitter's clock's frequency comprises receiving a signal having a time hopping code; providing a local clock reference having a time hopping code matching the time hopping code of the received signal wherein the local clock reference's frequency and the received signal's frequency are at an offset; adjusting the local clock reference until temporary alignment is achieved;

tracking the change in phase between the adjusted local clock reference and the received signal; and adjusting the frequency of the local clock reference to minimize the phase change. Tracking the change in phase between the adjusted local clock reference and the received signal may comprise counting the number of pulses of the received signal detected at a plurality of time positions over a first bit time; and counting the number of pulses of the received signal detected at a plurality of time positions over a second bit time later in time than first bit time. Adjusting the frequency of the local clock reference to minimize the phase change may comprise comparing the counts detected at the plurality of time positions of the first bit time to the counts detected at the plurality of time positions of the second bit time; increasing the frequency of the local clock reference responsive to the counts shifting to the right from first bit time to the second bit time; and decreasing the frequency of the local clock reference responsive to the counts shifting to the left from first bit time to the second bit time. In an embodiment, the method further comprises creating a timing sequence from the adjusted local clock reference.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention includes methods, and associated apparatuses, for generating, transmitting, detecting, and processing radio signals across a wireless interface using Ultra Wideband (UWB) pulses. A transmitted reference approach is utilized. The radio signal include pairs of UWB pulses with each pair of pulses separated by a fixed time delay. The two pulses are then combined to provide for improved noise immunity.

Transmitter topology, receiver topology and methods for generating and transmitting a radio signal at a transmitter and detecting and processing a radio signal at a receiver are provided.

Transmitter

The transmitter timing sequence is used to directly stimulate an Ultra Wideband (UWB) pulse generator circuit. The radio utilizes a dual-pulse transmitted reference transmission scheme. The transmitter emits at least two pulses separated with a fixed time delay. Similar work exists on transmitting a single reference pulse for a series of pulses. The current invention, in contrast, emits at least two pulses every time.

Figure 1:
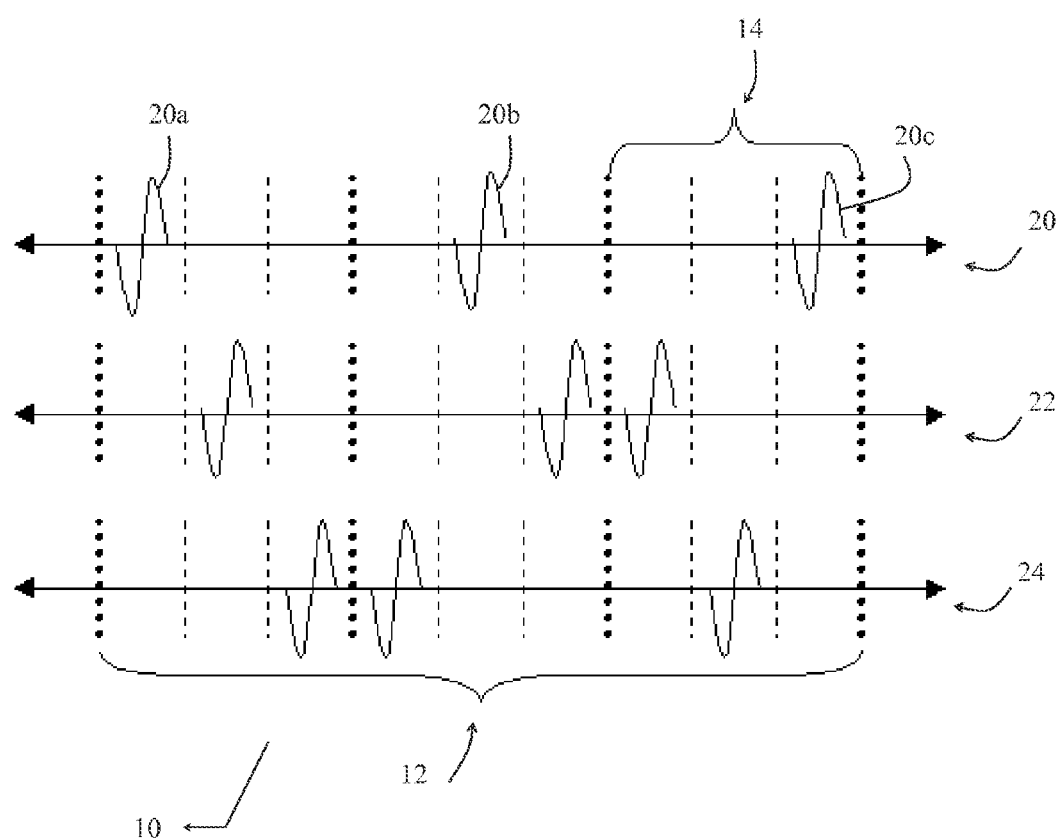
FIG. 1 is a graph showing multi-user transmission with time hopping access.
Figure 2:
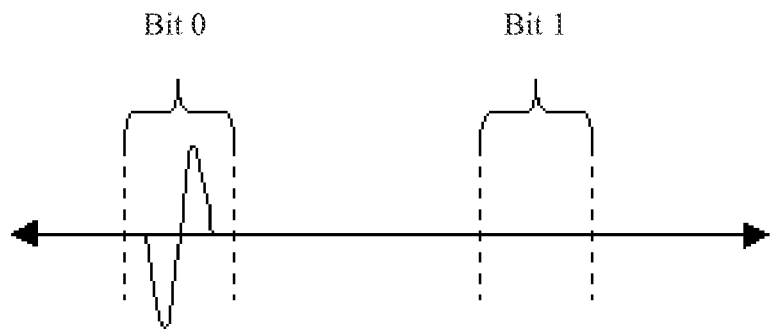
FIG. 2 is a graph showing On-Off Keying (OOK).
Figure 3:
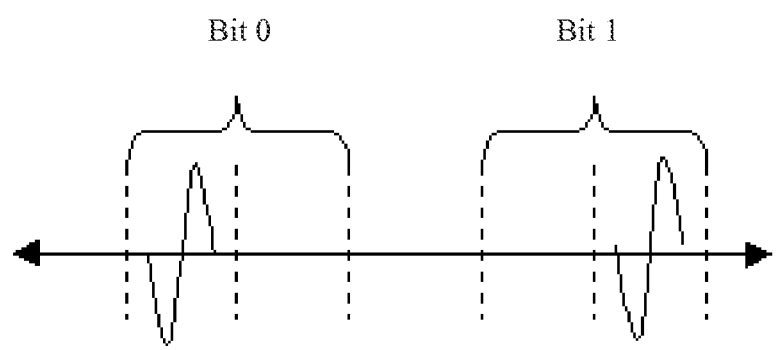
FIG. 3 is a graph showing Pulse Position Modulation (PPM).
Figure 4:
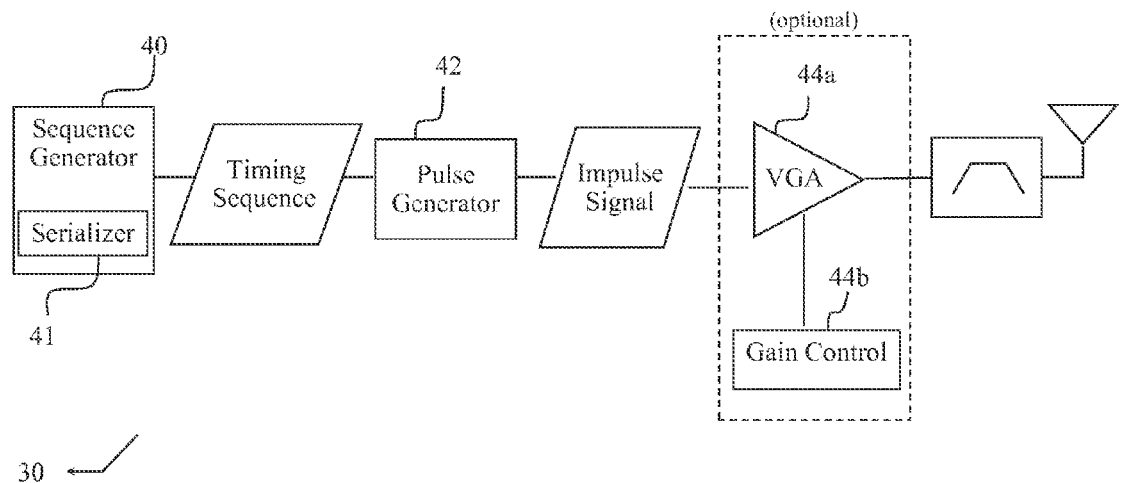
FIG. 4 is a block diagram of an illustrative transmitter topology.

FIG. 4 is a block diagram of an illustrative transmitter 30 topology for use with the current invention. Transmitter 30 includes sequence generator 40 having serializer 41, pulse generator 42, variable gain amplifier 44a and gain control 44b. In the example shown in FIG. 4, only On-Off Keying (OOK) and Pulse Position Modulation (PPM) are supported, yet other embodiments are contemplated. All modulation functions are performed in sequence generator 40. In a preferred in embodiment, sequence generator 40 is a Field Programmable Gate Array (FPGA) or an Application Specific Integrated Circuit (ASIC). Variable gain amplifier 44a and gain control 44b are not functionally required but add the flexibility of controlling the power output for various embodiments.

A high-speed sequence is preferred for optimal performance. The high-speed sequence is provided using a digital sequence generator and a high-speed serializer to multiplex the sequence rate into the gigahertz range.

There are currently many practical methods for generating radio frequency-impulses. These include various diodes (PIN, Schottky, varactor, and step recovery), avalanche transistors, and passive resonant circuits. The factors influencing the choice of implementation include cost, complexity, size, pulse repetition rate, and stability.

Figure 5:
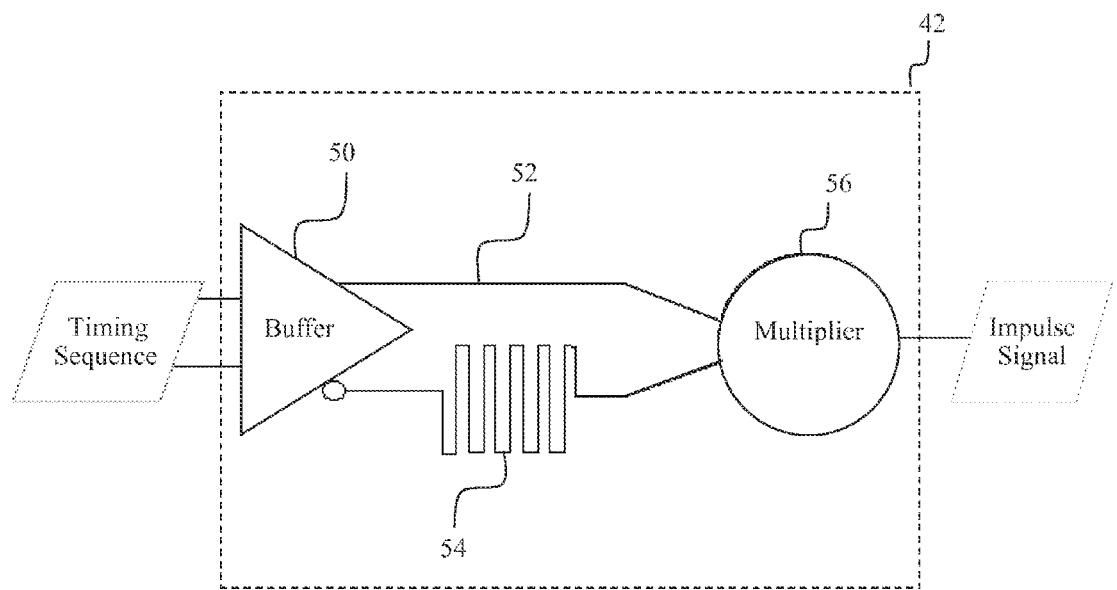
FIG. 5 is a block diagram of an illustrative pulse generator.

The circuit topology of pulse generator 42 for use in a preferred embodiment is shown in FIG. 5. Pulse generator 42 includes buffer 50, direct pulse line 52, delayed pulse line 54 and multiplier 56.

While other pulse generator approaches are contemplated, a preferred embodiment consists of a high-speed PECL buffer with a delay line and multiplier. PECL offers high-speed with a high output voltage swing. The PECL buffer generates a differential pair that is typically routed differentially. In one embodiment, one of the signal outputs will be delayed by one pulse width then multiplied.

Figure 6:
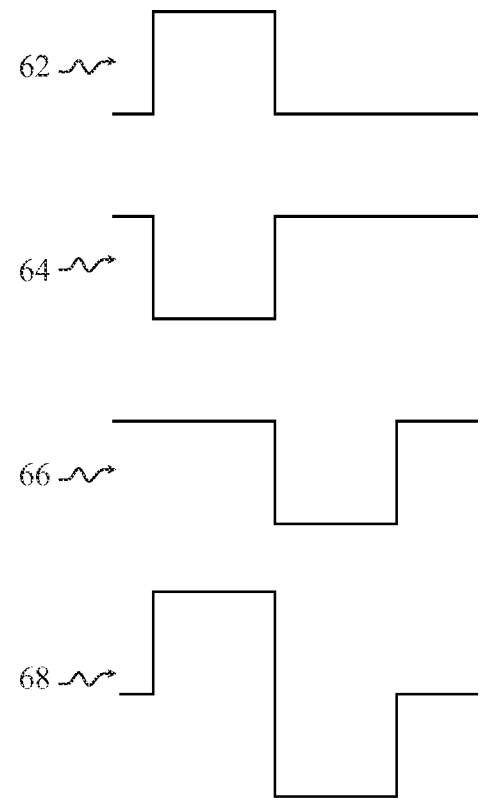
FIG. 6 is an illustration of pulse generator waveforms.
Figure 7:
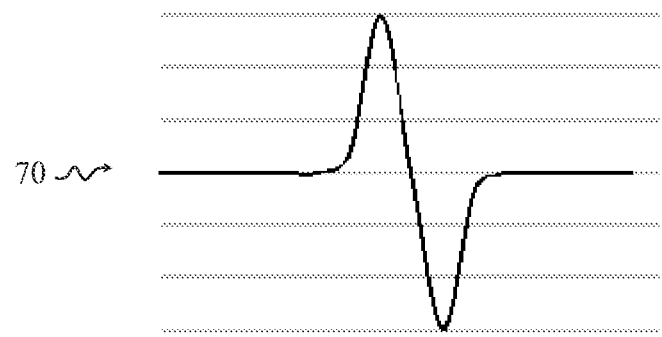
FIG. 7 depicts a monocycle after smoothing.

Illustrative waveforms 62, 64, 66, 68 resulting from the pulse generator are shown in FIG. 6 as ideal square waveforms. When waveform 62 is output from the buffer (FIG. 5, 50) along the direct pulse line (52) and waveform 64 is output from the buffer (50) along the delayed pulse line (54), waveform 64 is delayed resulting in the waveform represented by waveform 66. Waveform 62 enters the multiplier (56), followed by delayed waveform 66, resulting in a waveform represented by waveform 68. Inherent capacitance and inductance provide filtering, which results in smoothing of the signal to provide Gaussian monocycle shape 70 as shown in FIG. 7. A Gain Control (FIG. 4, 44B) may be required to adjust transmit power.

The bit error rate (BER) in a UWB communication system that employs (PPM) is given in equation 1, below:

$$P_b = Q\left(\sqrt{\frac{N_s E_{tx}}{2d^n \sigma^2}}\right) = Q\left(\sqrt{\frac{SNR}{Q}}\right) \qquad (1)$$

where $N_s$ is the number of pulses per symbol, $E_{tx}$ is the transmitted energy per pulse, d is the distance between the transmitter and receiver, n is the path loss exponent, $\sigma^2$ is the noise variance, and SNR denotes the signal-to-noise ratio. Table 1 provides an example performance calculation.

TABLE 1

| Bandwidth Calculation | | |
|---|---|---|
| 0.4 | ns | Time Resolution |
| 0.2 | ns | Monocycle Period |
| 2 | Integer | Pulse Duration (ns)/Time Resolution |
| 0.4 | ns | Pulse Duration (ns) |
| 50% | | Pulse Duty Cycle (time/width) |
| 9 | | Sequence Length |
| 4 | | Frame Size (pulses/frame) |
| 1 | | Clocks per pulse duration |
| 14.4 | | Bit (symbol) Time (ns) |
| 69.44 | | Bandwidth (MHz) |
| Power Calculation | | |
| 9 | | Pulses per symbol (Ns) |
| 7500 | MHz | Pulse Bandwidth (MHz) |
| 5.00E−03 | bps | Bit Error Rate (# errored bits per second) |
| −41.3 | dbm/Mhz | FCC Power Mask between 3.1-10.6 Mhz |
| 7.41E−05 | mW/Mhz | FCC Power Mask between 3.1-10.6 Mhz |
| 0.556 | mW/Mhz | FCC Max Energy Per Second |
| 0.625 | J | Energy Per Pulse |
| 2 | | pathloss exponent (n) |
| 1 | | noise variance (sigma^2) |
| 13.52 | | SNR |
| 0.64502 | | distance (m) |

Receiver

The receiver architecture implements a correlator receiver to detect UWB transmissions. The receiver takes the sum of the energy received during each pulse time over the entire bit time sequence. By detecting pulse event and then summing the events digitally, a simplified hardware interface is achieved.

Correlating receivers can be categorized as coherent or non-coherent receivers. For UWB the choice between coherent and non-coherent is driven by practical considerations. UWB relies on Time Hopping (TH) sequences for channelization. A coherent receiver allows the TH sequences to be generated serially, providing the flexibility of changing timing sequences dynamically in software. The down side of the coherent receiver is that there is increased complexity and cost because the design requires a local oscillator to track the phase and frequency of the transmitter.

Non-coherent UWB receivers rely on a delay-based approach that requires the use of analog delay lines that are difficult to fabricate, especially for long TH sequences. Delays in a non-coherent receiver should be long enough to match the time between consecutive pulses in a TH sequence. The non-coherent receiver is viable for short, fixed TH sequences where the delay between consecutive pulses is within the capabilities of delay lines and may provide a more cost effective solution.

Coherent receivers need timing and channel estimation while non-coherent receivers have less stringent timing requirements and do not require channel estimation.

A preferred embodiment of the present invention employs both coherent and non-coherent components. The transmitted reference scheme of the present invention is categorized as non-coherent because it relies on a fixed delay and detects the signal based on the relative locations of pulses in the received signal. This reduces the complexity of the radio because channel estimation is not needed; however, the transmitted reference scheme is also coherent because it provides for the flexibility of long software-defined sequences.

Figure 8:
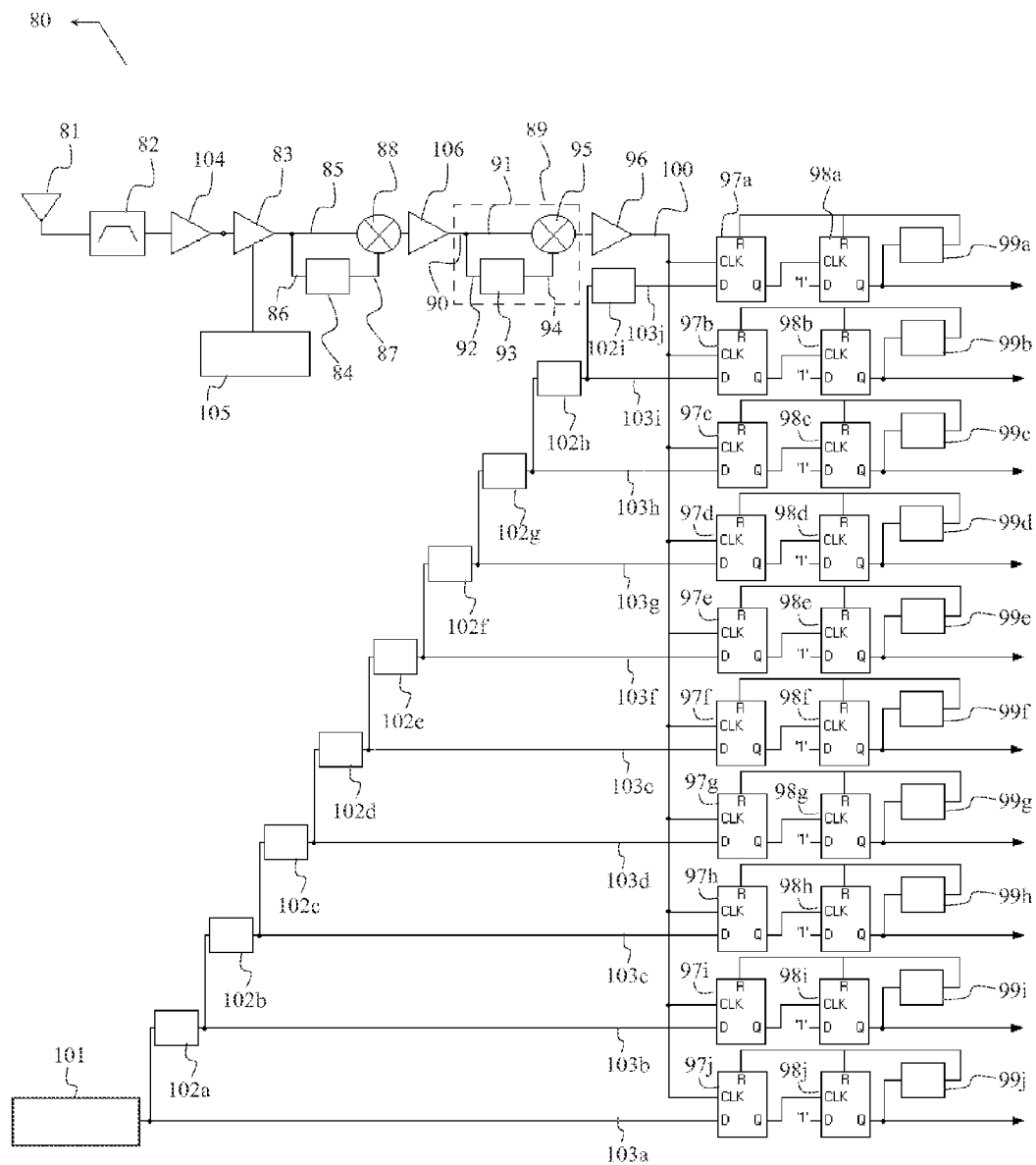
FIG. 8 is a block diagram showing an illustrative receiver topology utilizing an array of D-Flip Flip pairs.

The receiver of the present invention exploits the relatively small duty cycle and long frame duration of the TH sequence so that the data rate can be reduced. The data rate is reduced by representing detected pulses with a signal of a lower frequency, resulting in lower signal-processing costs. The output of the reduced data rate signals is used to increment counters that will be sampled and then reset every bit time. The counts are used to track the number of pulses that occurred in each time division of the total sampled window. This information is used to determine the phase shift of the transmit clock for synchronization purposes as well as the data encoded by PPM or OOK. The architecture described herein supports PPM where the pulse is shifted by an amount less than the sampling window. FIG. 8 shows the configuration used to detect UWB transmissions.

A block diagram of an embodiment of the receiver's UWB detection system 80 of the present invention is shown in FIG. 8. The first stage of receiver's UWB detection system 80 amplifies signal 81 received at antenna 82, using Low Noise Amplifier (LNA) 104 and Variable Gain Amplifier (VGA) 83 having gain control 105. After amplification, signal 81 is split into two signals, first signal 85 and second signal 86. Second signal 86 is delayed using fixed analog delay 84, which has a time delay that matches the time delay, t, between pulses sent by the transmitter. Multiplier 88 takes delayed signal 87 and first signal 85 as input and multiplies the two, causing superposition of the two and resulting in a signal peak with relatively large amplitude. The signal is then amplified by second LGA 106. This transmitted reference approach simplifies receiver's UWB detection system 80 by eliminating the need for a local pulse mask generator and the high complexity of channel estimation.

Figure 9:
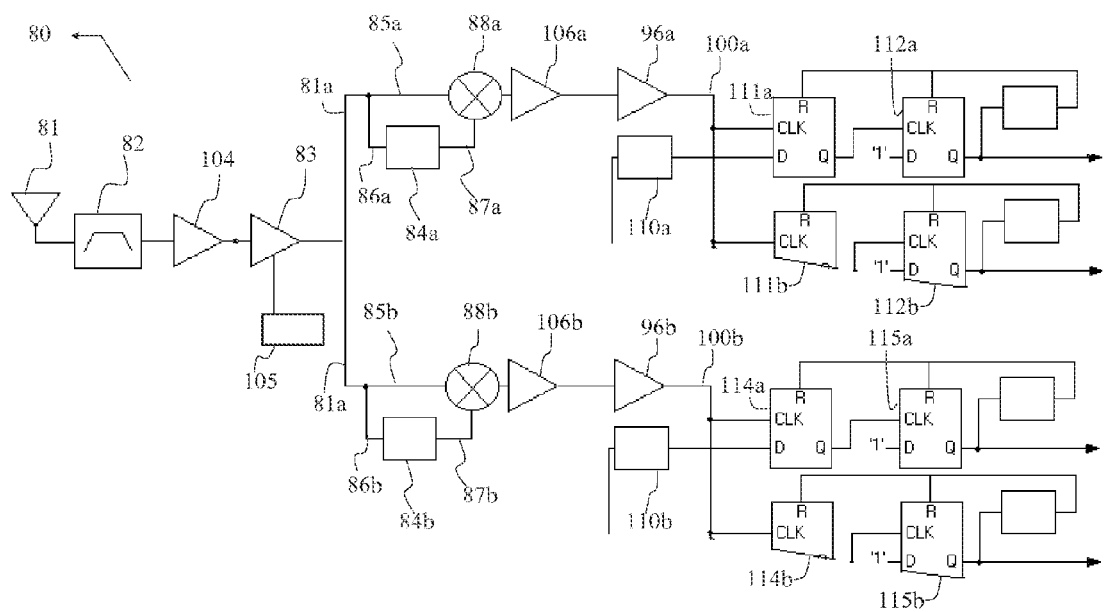
FIG. 9 is a block diagram of an alternate (relative to FIG. 8) receiver configuration.

An alternative embodiment of receiver's UWB detection system 80, shown in FIG. 9, allows two time delays to be used. Like the previous embodiment, signal 81 is received at antenna 82 and then amplified using LNA 104 and VGA 83, having gain control 105. However, after amplification signal 81 is duplicated into two signals, on signal 81a and off signal 81b.

On signal 81a, is again duplicated into two signals, first on signal 85a and second on signal 86a. Second on signal 86a is delayed using first delay 84a, which is used to indicate a one ('1') in the incoming signal. Multiplier 88a takes delayed on signal 87a and first on signal 85a as input and multiplies the two, causing superposition of the signals, resulting in a signal peak with relatively large amplitude. The signal is then amplified by second LGA 106a.

Off signal 81b is also again duplicated into two signals, first off signal 85b and second off signal 86b. Second off signal 86b is delayed using second delay 84b, which is used to indicate a zero ('0') in the incoming signal. Multiplier 88b takes delayed off signal 87b and first off signal 85b as input and multiplies the two, causing superposition of the signals, resulting in a signal peak with relatively large amplitude. The signal is then amplified by second LGA 106b. This topology is preferable for PPM and can be supported with the transmitter architecture shown in FIG. 4. It also has the benefit of better power spectrum because the periodic repetition of using only a single delay is reduced.

The second stage, shown in FIG. 8, is an optional Narrow Band Interference (NBI) canceller 89, used to reduce the effects of a single expected narrow band interfering signal. This stage can be replicated to remove multiple interfering signals. NBI canceller (NBIC) 89 splits NBIC incoming signal 90 into two, first NBIC signal 91 and second NBIC signal 92. Second NBIC signal 92 is delayed by fixed analog delay 93 by half the period of the interfering signal, and then delayed signal 94 and first NBIC signal 91 are taken as input by multiplier 95. Multiplication of the two results in cancellation of the interfering signal. This may result in replicated pulse peaks; however, these are interpreted as multipath by receiver 80. NBI can cause problems with this architecture especially when the interfering signal is at a frequency higher than the pulse duration.

Amplification must be sufficient to provide a logic level output to high-speed buffer 96 (FIG. 9: 96*a*, 96*b*). Although one buffer is shown in FIG. 8, the practical implementation may require multiple buffers to fan out the signals to the multiple loads. The output of buffer 96 (FIG. 9: 96*a*, 96*b*) is taken as clock signal 100 (FIG. 9: 100*a*, 100*b*) by a first array of one or more D Flip-Flops (DFF) (i.e. 97*a*-97*j*; FIG. 9: i.e. 111*a*-111*b*, 114*a*-114*b*). The D-inputs of the first array of DFFs (i.e. 97*a*-97*j*; FIG. 9: i.e. 111*a*-111*b*, 114*a*-114*b*) propagate from the timing sequence signal 101 at various time delays. A second array of one or more DFFs (i.e. 98*a*-98*j*; FIG. 9: i.e. 112*a*-112*b*, 115*a*-115*b*) takes the Q-output of the first array of DFFs as its clock input. The D-input of the second array of DFFs are tied to a logic value of one ('1'). The output of the DFFs (i.e. 97*a*-97*j* FIG. 9: i.e. 111*a*-111*b*, 114*a*-114*b*) are updated with the logic level of the DFF input when clock signal 100 rises from a low state to a high state (rising edge) and the switching threshold of the DFFs (i.e. 97*a*-97*j*; FIG. 9: i.e. 111*a*-111*b*, 114*a*-114*b*) are exceeded. The peaks of clock signal 100 can be used to switch the clock input of high-speed flip-flops such that high frequency events can be captured and a pulse, having a longer duration, can be generated when a peak occurs within the sample window.

The output of the flip-flop stage is provided at a fraction of the rate of the incoming signal. Each output will toggle if a transition is detected during a valid time sequence. The signal can then be fed to a lower frequency device, such as an FPGA, to count the number of transitions during a bit time. The highest clock rates seen by this counter will be in the range of two times the frame frequency, and most of the counter's processing will occur at rates below the rate of a bit time. This allows for the use of a smaller counter and time-sharing of, resulting in more efficient use of logic and power.

To be able to track events that occur at specific time instances, the above edge detection method should be replicated and cascaded in time by applying time delays such that the time window (set by the timing sequence 101 pulse width) for each edge detector overlaps the previous by at least half the period of the time window. This is preferred because the PCB layout will have variations in components and delays. Overlap will help to ensure that the design is robust to variation. In addition, if some gates latch up due to meta-stability, the results from adjacent gates can be used, providing redundancy and fault tolerance. An array of one or more delays (i.e. 102*a*-102*i*; FIG. 9: i.e. 110*a*, 110*b*) are implemented by replicating the timing sequence 101 generated by the receiver into n (10 for the illustration shown in FIG. 8 and discussed here) consecutive signals (i.e. 103*a*-103*j*) and delaying each consecutive signal (i.e. 103*b*-103*j*) with respect to the previous time. First consecutive timing signal 103*a* continues from original time signal sequence 101 without delay. Each remaining consecutive timing signal (i.e. 103*b*-103*j*) is delayed by less than half of timing sequence 101 pulse duration. These consecutive timing signals (i.e. 103*a*-103*j*) will each represent a specific time position and be used as D-inputs to DFFs of the first array of DFFs (i.e. 97*a*-97*j*). The n logic gates are each enabled at different times such that each enable time overlaps with the next consecutive time by a fraction $$\left(\frac{a}{b}\right)$$

of the sequence time period ($T_s$) so that n logic gates cover a total time (t) of $$t = T_s\left(\frac{b-a}{b}\right)n.$$

If a transition occurs on the clock input of a DFF in the first array of DFFs (i.e. 97*a*-97*j*) while the timing sequence is valid then the output will transition high causing the output of the corresponding DFF of the second array of DFFs (i.e. 98*a*-98*j*) to transition high and remain high until both DFFs are reset after time $T_d$. The delay $T_d$, provided by an array of one or more fixed analog delays (i.e. 99*a*-99*j*), ensures that the frequency (F) of the signal is now less than $F=1/T_d$. Now this low frequency signal can be used to increment low speed counters. Accordingly, each logic gate only requires one signal for single ended or two signals for differential signaling. This results in reduced hardware I/O requirements.

The process of matching the clock reference of the receiver to that of the transmitter is referred to as synchronization. Both transmitter and receiver interfaces will have separate clock reference sources each with frequency stability to within +/−100 ppm of each other. Oscillators with tighter clock stability may be used to improve acquisition times.

Synchronization, in a preferred embodiment, is attained and maintained as follows. For communication, the transmitter of the transmitting radio is configured with the same TH code as the receiver of the receiving radio. Since both clock sources are initially unsynchronized there will be a frequency offset between the transmitter and receiver. The codes for each will gradually change each's phase until both temporarily align. If phase change continues the signals would shift out of alignment.

Figure 10:
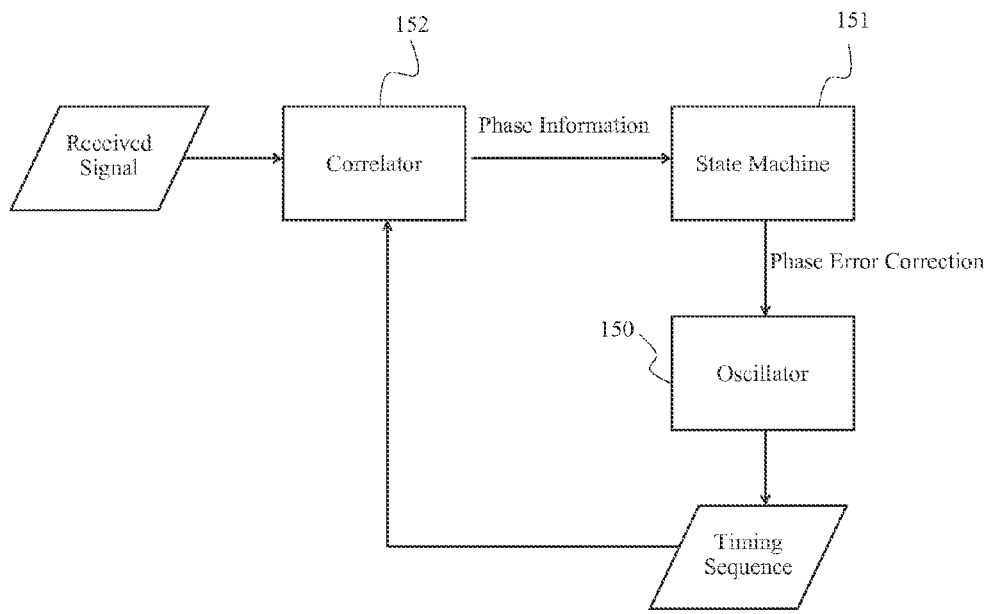
FIG. 10 is a top-level block diagram of clock synchronization.

Because the architecture provides an array of n time steps, the phase change is tracked once temporary alignment is attained and then the local reference frequency is adjusted to minimize phase change. The top-level block diagram of the synchronization approach is shown in FIG. 10. The local reference frequency is continuously adjusted during normal operation so that its average frequency is equal to the transmitter's frequency. For frequency adjustment, oscillator 150 generates the receivers' clock reference and is under the counter's direct control. State machine 151 controls acquisition and synchronization. Synchronization is maintained by keeping the first received pulse centered within the whole time window.

State machine 151 controls the process for signal acquisition. The first state of state machine 151 seeks to find a valid signal output from correlator 152 with the local clock at an offset. Once valid signals have been detected, marked by the counts representing a step-like distribution across the n-counters, state machine 151 begins to compensate for the frequency offset between the transmitter and receiver. The direction of clock adjustment is based on the direction of movement of step distribution.

Figure 11:
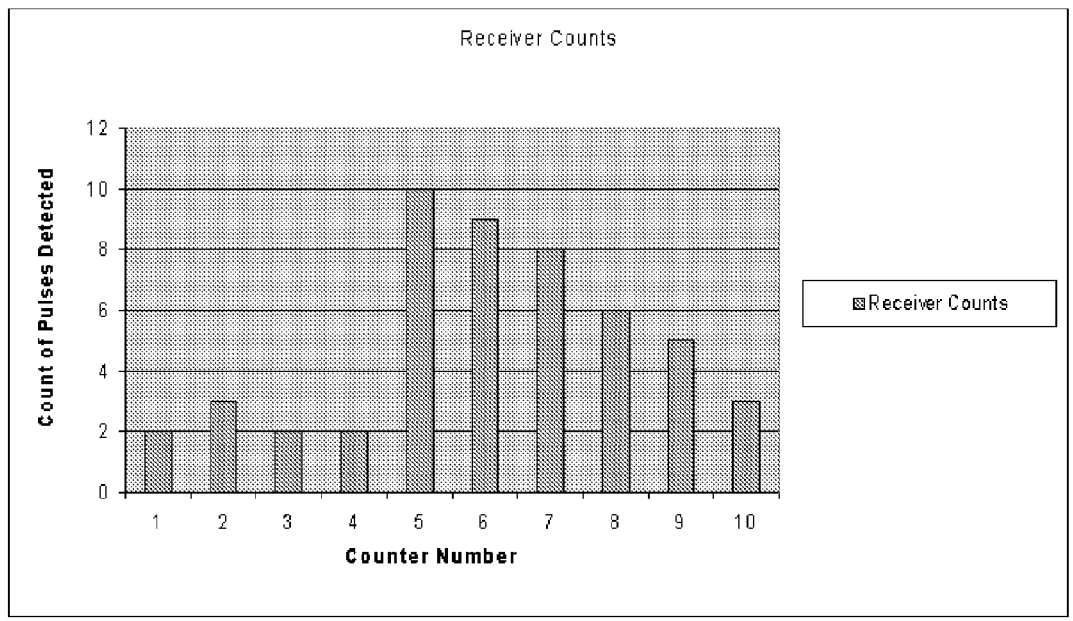
FIG. 11 is a graph of an example initial distribution of counter inputs.
Figure 12:
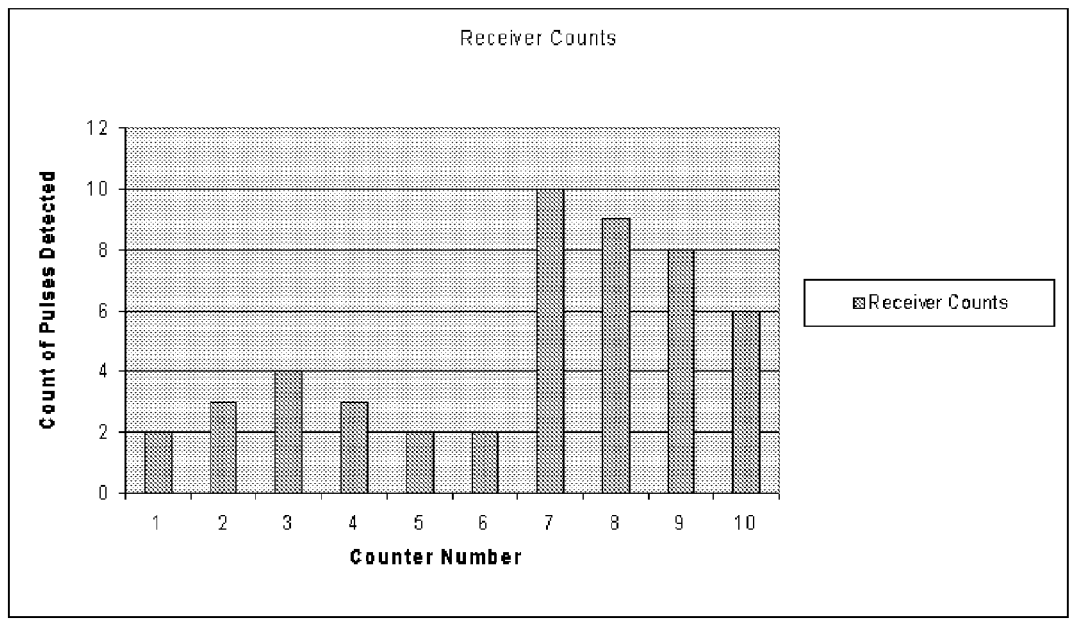
FIG. 12 is a graph of an example subsequent distribution of counter inputs (TX frequency higher).
Figure 13:
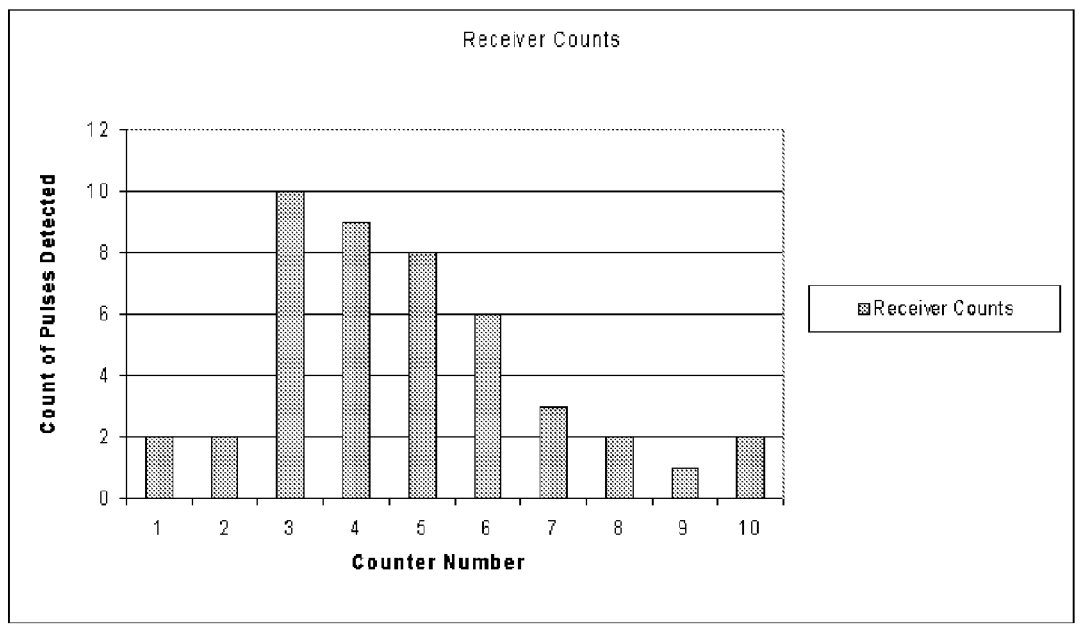
FIG. 13 is a graph of an example subsequent distribution of counter inputs (TX frequency lower).
Figure 14:
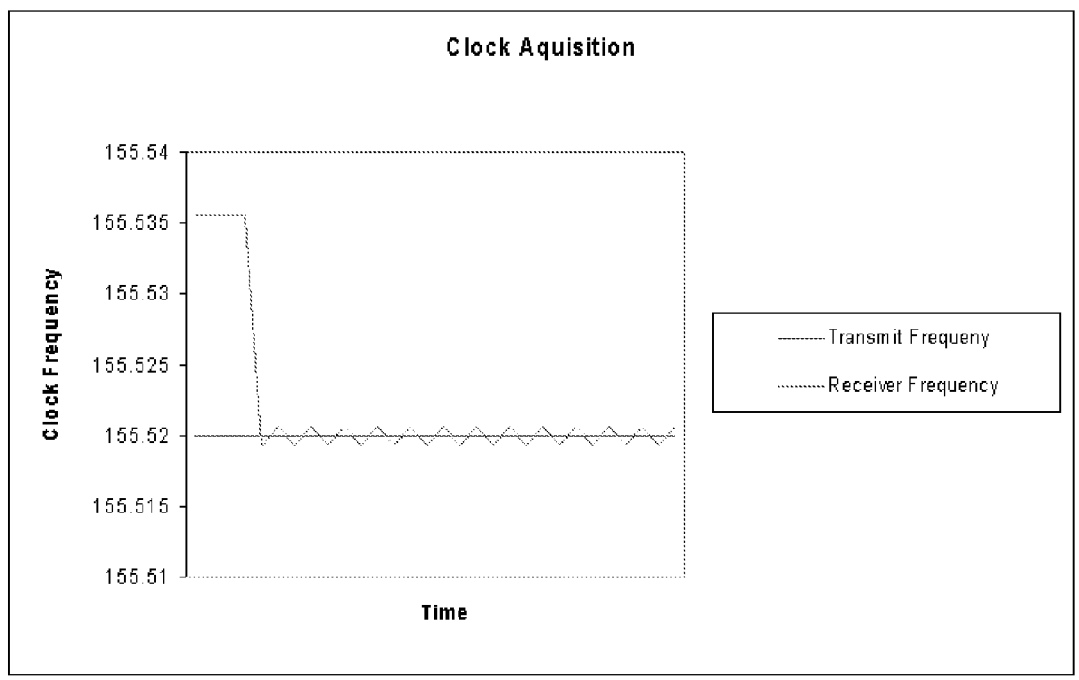
FIG. 14 is a graph of clock acquisition.

The distribution of count values indicating the presence of a detected Pseudo-Random Number Sequence (PN Sequence) as related to frequency offset are illustrated in FIGS. 11-13. FIG. 11 shows the detection position of a PN sequence soon after the PN sequence has been detected. The counter number increases with time as the data is sampled. For example, counter number 1 receives data earliest in time and counter number 2 receives data second in time after counter number 1 and so on. The distributions of FIGS. 12 and 13 show two possible distributions several bit times later. In FIG. 12, the position of the detected sequence moved to the right of its initial location, indicating that the transmitter clock is at a higher frequency than the local clock reference. In this case, the synchronization circuit would increase the frequency of the local clock reference to compensate for the detected offset. In FIG. 13, the position of the detected sequence moved to the left of the location where it was initially detected, indicating the transmitter clock is at a lower frequency than the local clock reference. In this case, the local reference clock frequency would be reduced. Clock adjustments are required continuously during operation of the radio, because the exact transmitter frequency is never attained. The adjustment process results in an average clock frequency that matches that of the transmitter and also keeps the detected clock sequence centered in the time window covered by the sequence detector. If the sequence is lost, then the detection process restarts from the beginning FIG. 14 gives an example of the expected behavior of the receiver frequency during clock acquisition with time. In the example, the local transmit reference starts at +100 ppm off from the center frequency of the transmit clock. Once the sequence is detected, the receiver makes an initial course adjustment, then monitors the change in frequency and then adjusts until the phase change is minimal. At this point it will begin the fine synchronization adjustments. During fine adjustments the receiver frequency will average out to match the transmit frequency resulting in synchronization.

A voltage-controlled oscillator (VCO) or numerically controlled oscillator (NCO) can be used for generating the local clock reference. The VCO requires only a single voltage input to control the offset of the clock frequency while the NCO requires a digital word.

The digital signal-processing requirements for synchronization are simplified because the input is reduced to an array of n count variables where each variable represents the count of transitions that occurred during one-bit time at each of the n time positions at each of the n flip-flops. One-bit time is the amount of time that it takes for the sequence to repeat. The receiver's serializer is synchronized with the counter such that the total count for each bit period is captured and stored so that processing can be performed at a lower rate. The selection of appropriate data encoding methods, such as interleaving and error detection and correction codes, will be apparent to one of skill in the art given the demands of a particular embodiment as dictated by its intended use.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for receiving and processing a radio signal in a transmitter-receiver environment, comprising:
   receiving the radio signal having at least two pulses and a fixed time between the at least two pulses;
   amplifying the received radio signal;
   generating a larger-amplitude signal with an amplitude greater than an amplitude of the received radio signal;
   amplifying the larger-amplitude signal;
   replicating the larger-amplitude signal to generate at least two duplicate signals;
   generating a timing sequence;
   replicating the timing sequence into a plurality of timing sequences each delayed in time; and
   outputting at least a first counter value responsive to a value of one of the plurality of timing sequences being valid when the value of at least one of the at least two duplicate signals transitions.

2. The method of claim 1, wherein generating the larger-amplitude signal with an amplitude greater than the amplitude of the received signal includes:
   delaying the received radio signal by the fixed time between the at least two pulses; and
   combining the delayed radio signal and the received radio signal.

3. The method of claim 2, wherein combining the delayed radio signal and the received radio signal includes multiplying the delayed radio signal and the received radio signal, summing the delayed radio signal and the received radio signal, and superpositioning the delayed radio signal and the received radio signal.

4. The method of claim 1, further comprising removing an interfering signal, having a known period, from the larger-amplitude signal.

5. The method of claim 4, wherein removing the interfering signal, having a known period, from the larger-amplitude signal includes:
   delaying the larger-amplitude signal by the period of the interfering signal; and
   multiplying the delayed larger-amplitude signal and the interfering signal.

6. The method of claim 1, wherein the plurality of timing sequences are consecutive timing sequences delayed in time by less than half of the fixed time between the at least two pulses of the original timing sequence.

7. The method of claim 1, further comprising:
   summing the value of the first counter value over a first period of time;
   summing the value of at least a second counter value over the first period of time;
   tracking the number of pulses that occur over a second period of time using at least the sum of the value of the first counter value and the sum of the value of the second counter value; and
   adjusting the phase of the timing sequence using the number of pulses.

8. The method of claim 1, further comprising:
   generating a pseudo-random sequence with a time hopping code matching that of a transmitter;
   detecting the pulses at a plurality of times dictated by the pseudo-random sequence;
   summing the pulses at a plurality of time periods during the times dictated by pseudo-random sequence; and
   determining a phase shift of an incoming signal over a bit time.

9. The method of claim 8, further comprising synchronizing the clock of a receiver with the received radio signal using the phase shift of the incoming signal.

10. The method of claim 8, further comprising demodulating the data in the received radio signal using the phase shift of the incoming signal.

11. A receiver, comprising:
- a receiving stage that receives a radio signal having at least two pulses and a fixed time between the at least two pulses;
- an amplifier stage that amplifies the received radio signal;
- a signal modification stage that generates a signal having an amplitude larger than an amplitude of the received radio signal;
- an amplification stage that amplifies the larger-amplitude signal;
- a fan-out stage that replicates the larger-amplitude signal and generates at least two duplicate signals based at least in part on the replicated larger-amplitude signal;
- a sequence generator stage that serially generates a timing sequence;
- at least one sequence delay stage that replicates the timing sequence into a plurality of timing sequences each delayed in time; and
- at least one counter control stage that outputs a counter value responsive to a pulse of one of the duplicate larger-amplitude signals and one of the plurality of timing sequences.

12. The receiver of claim 11, wherein the signal modification stage includes:
- at least one signal delay stage that delays the received radio signal by the fixed time between the at least two pulses; and
- at least one combination stage that combines the delayed radio signal and the received radio signal.

13. The receiver of claim 12, wherein the at least one combination stage includes a multiplier that multiplies the delayed radio signal and the received radio signal.

14. The receiver of claim 12, wherein the at least one combination stage includes a summer that sums the delayed radio signal.

15. The receiver of claim 11, further comprising at least one removal stage that includes:
- at least one delay stage that delays the larger-amplitude signal by the period of an expected interfering signal; and
- at least one multiplier that multiplies the delayed larger-amplitude signal and the expected interfering signal.

16. The receiver of claim 11, wherein the plurality of timing sequences are consecutive timing sequences delayed in time by less than half of the fixed time between the at least two pulses of the original timing sequence.

17. The receiver of claim 11, wherein the counter value is responsive to a rising edge of the pulse of the duplicate larger-amplitude signal.

18. The receiver of claim 17, wherein the value of the timing sequence is output on the rising edge of the pulse of the duplicate larger-amplitude signal.

19. The receiver of claim 11, wherein the counter control stage includes:
- a first D flip-flop with an input connected to the timing sequence and a clock connected to the pulse of the duplicate larger-amplitude signal that outputs the value of the timing sequence based on the pulse of the duplicate larger-amplitude signal; and
- a second D flip-flop with an input set to a predetermined value and a clock connected to the output of the first D flip-flop that outputs the predetermined value when the clock is enabled by the timing sequence.

20. The receiver of claim 11, wherein the amplifier stage includes at least one of a low-noise amplifier or a variable-gain amplifier.

* * * * *